United States Patent
Fraley et al.

(10) Patent No.: US 6,275,868 B1
(45) Date of Patent: Aug. 14, 2001

(54) SCRIPT ENGINE INTERFACE FOR MULTIPLE LANGUAGES

(75) Inventors: Christopher Lee Fraley, Woodinville; Samuel James McKelvie, Seattle; Victor Andrew Stone, Mercer Island; Robert Victor Welland, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/815,719

(22) Filed: Mar. 12, 1997

(51) Int. Cl.[7] ................................................. G06F 9/44
(52) U.S. Cl. .............................................................. 709/320
(58) Field of Search ..................................... 395/701–705; 709/300, 302, 303, 310–332; 717/1–10

(56) References Cited

U.S. PATENT DOCUMENTS

| | | | |
|---|---|---|---|
| 5,432,940 | * 7/1995 | Potts et al. | 709/320 |
| 5,475,843 | * 12/1995 | Halviatti et al. | 717/4 |
| 5,669,000 | 9/1997 | Jessen et al. | 717/4 |
| 5,745,738 | * 4/1998 | Ricard | 703/13 |
| 5,768,510 | * 6/1998 | Gish | 709/203 |
| 5,854,930 | 12/1998 | McLain, Jr. et al. | 717/5 |
| 5,857,201 | * 1/1999 | Wright et al. | 707/104 |
| 6,038,590 | * 3/2000 | Gish | 709/203 |

OTHER PUBLICATIONS

Dilascia and Stone, "Sweeper," *Microsoft Interactive Developer*, vol. 1, No. 1, pp. 16–52 (1996).

Box, D., "Say Goodbye to Macro Envy With Active Scripting," *Microsoft Interactive Developer*, 7pp. (Feb. 1997).

Pleas, K., "Visual Basic Script," *Microsoft Interactive Developer*, pp. 55–63 (Spring 1996).

(List continued on next page.)

*Primary Examiner*—St. John Courtenay, III
(74) *Attorney, Agent, or Firm*—Klarquist Sparkman Campbell Leigh & Whinston, LLP

(57) ABSTRACT

The scripting engine interface provides the capability to interconnect any suitably written application or server with any scripting language. The implementation of the scripting engine itself (language, syntax, persistent format, execution model, and the like) is left entirely to the vendor, and the scripting engine need not come from the same vendor as the host application. The scripting engine interface implements this capability using a set of interfaces, the two most important ones being IActiveScriptSite (implemented by the host application) and IActiveScript (implemented by the language engine.) Together, these interfaces allow a host application to inform a scripting engine about the functionality that can be scripted and to define the scripts that the scripting engine should execute, either immediately or in response to user actions such as mouse clicks. The scripting engine interface redefines the handshake that is required between two specific types of software components in a manner not previously done. Unlike past scripting engine interfaces, which define a unique and proprietary way of hooking up to an application, the interface described here provides a universal hookup mechanism that is simple and direct.

23 Claims, 2 Drawing Sheets

OTHER PUBLICATIONS

Brockschmidt, K., "OLE Automation and Automation Objects," *Inside OLE*, Second Ed., Chapter 14, pp. 635–730 (1995).

Brockschmidt, K., "OLE Automation Controllers and Tools," *Inside OLE*, Second Ed., Chapter 15, pp. 731–760 (1995).

Microsoft Corporation, "Working With Batch Programs," *MS DOS 5.0 User's Guide& Reference*, Chapter 10, pp. 225–244 (1991).

Wall, L. et al., "An Overview of Perl," *Programming Perl*, Chapter 1, pp. 1–34 (1996).

Rahmel, Dan, "Comparing JavaScript and VBScript," DBMS, pp(9). Oct. 1996.*

Kaufman, Saunders, et al., "Teach yourself ActiveX programming in 21 days," Sams Publishing, pp(19). Nov. 1996.*

(no author given) "Inside Macintosh—Interapplicaton Communication," Addison–Wesley, Chapters 1, 7, 8 and 10, 1993.*

* cited by examiner

SCRIPT ENGINE INTERFACE FOR MULTIPLE LANGUAGES

FIELD OF THE INVENTION

This invention relates to a script engine interface that enables host applications to support disparate scripting languages from multiple sources and vendors, and that allows details of the script engines (language, syntax, persistent format, execution model, etc.) to be implemented independently of the host application. The interface also allows the host application to discover which script engines are available on the host machine. Thus any application can easily support any suitably implemented scripting language desired by the user.

PROBLEM

In the present software technology, there are two types of software components: scripting languages and applications. A user writes programs in a scripting language that automate functionality exposed by the host application. For example, a user might write a script in Visual Basic for Applications™ (VBA) to automatically create a chart using the graphics functions of Microsoft Excel.

However, under the current technology, each language engine is tightly coupled to a particular host application using proprietary interfaces that are different for every application. This means that users have no choice about which scripting engine to use with their application. They must use the language that was specifically designed for and included with the application, which is not necessarily the best language for their particular purposes. Similarly, scripting engine providers have a limited market for their products because they are unable to make their language engines interoperate with existing applications, due to the fact that the interfaces to those applications are proprietary, unpublished, and different for every application.

SOLUTION

The scripting engine interface of the present invention overcomes these problems and provides an advance in the art by introducing the capability to interconnect any suitably written application or server with any scripting language. The implementation of the script engine itself (language, syntax, persistent format, execution model, and the like) is left entirely to the vendor, and the script engine need not come from the same vendor as the host application.

The scripting engine interface design implements this capability using a set of interfaces, the two most important ones being IActiveScriptSite (implemented by the host application) and IActiveScript (implemented by the language engine.)

Together, these interfaces allow a host application to inform a script engine about the objects that can be scripted and to define the scripts that the engine should execute, either immediately or in response to user actions such as mouse clicks.

The scripting language engine interface redefines the handshake that is required between scripting engines and applications in a manner not previously done. Unlike past script engine interfaces, which define a unique and proprietary way of hooking up to an application, the interface described here provides a universal hookup mechanism that is simple and direct. This allows application vendors to design applications that can easily be scripted using any language desired by users, simply by exposing an object model for automation, supporting the interfaces to host script engines, and loading scripts into those engines. Similarly, language vendors can define language engines which will hook up to any suitably written application, without having to know the details of that application. Language vendors, application vendors, and end users all benefit from the increased choice and interoperability.

DETAILED DESCRIPTION

Figure 1:
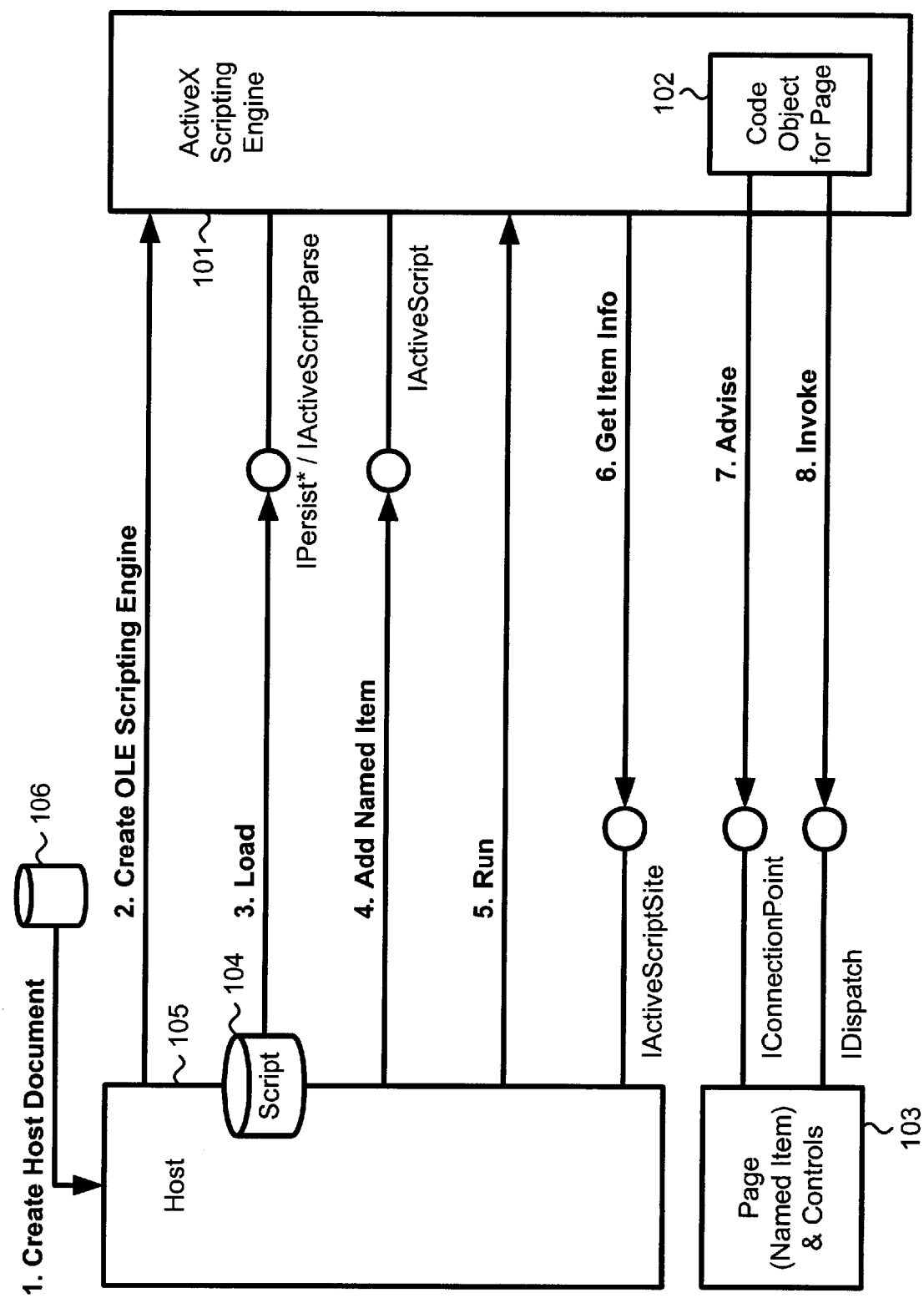
FIG. 1 illustrates in block diagram form the operating environment and components which comprise the scripting language engine interface of the present invention.

The scripting language engine interface provides the capability to add scripting and OLE Automation capabilities to programs such as applications or servers. The scripting language engine interface is embodied in the commercially available product known as Microsoft ActiveX™ Scripting (ActiveX Scripting), and enables host computers to call upon disparate scripting engines from multiple sources and vendors to perform scripting between software components. The implementation of the script itself: language, syntax, persistent format, execution model, and the like is left to the script vendor. Care has been taken to allow host computers that rely on ActiveX Scripting to use arbitrary language "back ends."

Definitions

The following list contains definitions of the scripting-related terms used in this document.

| Term | Definition |
| --- | --- |
| Script | The data that makes up the "program" that the scripting engine runs. A script is any executable code, including a piece of text, a block of pcode, or even machine-specific executable byte codes. A host computer loads a script into the scripting engine through one of the IPersist* interfaces or through the IActiveScriptParse interface. |
| Script language | The language in which a script is written (for example, VBScript) and the semantics of that language. |
| Scripting engine | The object that processes scripts. A scripting engine implements IActiveScript and, optionally, IActiveScriptParse. |
| Scripting host | The application or program that owns the ActiveScripting engine. The scripting host implements IActiveScriptSite and, optionally, IActiveScriptSiteWindow. |
| Scriptlet | A portion of a script that gets attached to an object event through IActiveScriptParse. The aggregate collection of scriptlets is the script. |
| Code object | An instance created by the scripting engine that is associated with a named item, such as the module behind a form in Visual Basic¨, or a C++ class associated with a named item. |
| Named item | An object (preferably one that supports OLE Automation) that the host computer deems interesting to the script. Examples include the HTML Document object in a Web browser, and the Selection object in Microsoft Word. |

| Term | Definition |
| --- | --- |
| Event | A signal generated by a user action (such as clicking a mouse) or by a software component (such as a software clock with a "tick" event) which causes associated scriptlets to run whenever the event occurs. |

ActiveX Scripting Background

ActiveX Scripting components fall into two categories: ActiveX scripting hosts and ActiveX scripting engines. A scripting host computer creates a scripting engine and calls on the scripting engine to run the scripts. Examples of existing and potential ActiveX scripting hosts include:

Web browsers

Internet authoring tools

Servers

Office applications

Computer Games

ActiveX scripting engines can be developed for any language or run-time environment, including:

Microsoft Visual Basic for Applications (VBA)

Microsoft Visual Basic Scripting Edition (VBScript)

JScript

Perl

Lisp, Scheme

The ActiveX Scripting design isolates the interface elements required only in an authoring environment so that non-authoring host computers (such as browsers and viewers) and scripting engines (for example, VBScript) can be kept lightweight.

Basic Architecture

FIG. 1 illustrates in block diagram form the operating environment and components which comprise the scripting language engine interface of the present invention, and in particular the interaction between an ActiveX scripting host 105 and an ActiveX scripting engine 101. This example includes the creation of a scripting engine 101 and the execution of a script input thereon. The following description details the steps involved in the interaction between the scripting host 105 and scripting engine 101 (the actual nesting of the function calls is omitted for clarity) and illustrates the flow of information between these components:

1. Create a Project. The scripting host 105 loads a project or document into its workspace from data storage 106 or a data communication interface (not shown) in well-known fashion. (This step is not particular to ActiveX Scripting, but is included here for completeness.)

2. Create the ActiveX Scripting Engine. The scripting host 105 calls the function CoCreateinstance to create a new ActiveX scripting engine 101, specifying the class identifier (CLSID) of the specific scripting engine 101 to use. For example, the HTML browsing component of Internet Explorer receives the scripting engine's class identifier through the CLSID=attribute of the HTML <OBJECT> tag. The scripting host 105 can create multiple scripting engines for use by various applications, and the process of initiating a new scripting engine is well-known.

3. Load the Script. Once the new scripting engine 101 is created, if the script contents have been persisted, the scripting host 105 calls the scripting engine's IPersist*::Load method to feed it the script storage, stream, or property bag that is resident on the scripting host 105. This exposes application's object model to the scripting engine 101, by for example handing one or more application objects to the scripting engine 101. Otherwise, the scripting host 105 uses IPersist*::InitNew or IActiveScriptParse::InitNew to create a null script. A scripting host 105 that maintains a script as text can use IActiveScriptParse::ParseScriptText to feed the scripting engine 101 the text of the script, after calling the function InitNew.

4. Add Items. For each top-level named item 103 (such as pages and forms) imported into the scripting engine's name space 102, the scripting host 105 calls IActiveScript::AddNamedItem to create an entry in the scripting engine's name space 102. This step is not necessary if top-level named items 103 are already part of the persistent state of the script loaded in step 3. A scripting host 105 does not use AddNameditem to add sublevel named items (such as controls on an HTML page); rather, the scripting engine 101 indirectly obtains sublevel items from top-level items by using the host's ITypeInfo and IDispatch interfaces.

5. Run the Script. The scripting host 105 causes the scripting engine 101 to start running the script by passing the SCRIPTSTATE_CONNECTED value to IActiveScript::SetScriptState. This call would likely perform any scripting engine construction work, including static bindings, hooking up to events (see below), and executing code similar to a scripted "main( )" function.

6. Get Item Information. Each time the scripting engine 101 needs to associate a symbol with a top-level item, it calls the IActiveScriptSite::GetItemInfo method, which returns information about the given item.

7. Hook Up Events. Before starting the actual script, the scripting engine 101 connects to the events of all the relevant objects through the IConnectionPoint interface and other methods. As shown in FIG. 1, the IConnectionPoint::Advise(pHandler) message provides the scripting host 105 with a request for notification of any events that occur in the scripting host 105. The message passes an object pHandler that the OAServer can call when an event occurs in the scripting host 105. Once an event occurs in the scripting host 105, the scripting host 105 transmits a message to the scripting engine 101 pdispHandler::Invoke(dispid) to notify the scripting engine 101 that an event occurred in the scripting host 105. If the event matches a monitored event in the scripting engine 101, the scripting engine 101 can activate a response, such as executing user written code.

8. Invoke Properties and Methods. As the script runs, the scripting engine 101 realizes references to methods and properties on named objects through IDispatch::Invoke or other standard OLE binding mechanisms.

Additional implementation details of ActiveX Scripting are disclosed herein as well as in Appendix A attached hereto, which document describes ActiveX Scripting Interfaces and Methods.

Basically, the user exposes internal objects of the application via OLE Automation and the resultant OLE Automation object is an entity which exposes properties and methods of the application. A method is an action which the object can perform, while a property is an attribute of the object, like a variable. The OLE Automation Interfaces include IDispatch which is an interface to manipulate OLE Automation objects. This process is used to get a property, set a property, or call a method. The process uses "late binding" mechanism that enables a simple, interpreted language. Type information in the OLE Automation includes ITypeinfo which is used for describing an object. A collection of these TypeInfos constitutes a type library, which usually exists on a disk in the form of a data file. The data file can be accessed through ITypeLib and is typically created using MKTypLib. In ActiveX scripting, the type information is provided by scripting hosts and objects that are used by the scripting hosts. The type information is then used by the scripting engines.

Active Scripting Engine

To write an Active Scripting engine, the user writes an OLE Component Object Model object that supports the following interfaces:

| Interface | Required? | Description |
| --- | --- | --- |
| IActiveScript | Yes | Basic scripting ability. |
| IPersist* | Yes-one of the following: | Persistence support. |
| IPersistStorage |  | DATA={url} syntax for OBJECT tag. |
| IPersistStreamInit | . | Same as above, as well as DATA= "string-encoded byte stream" syntax for OBJECT tag. |
| IPersistPropertyBag | . | PARAM= syntax for OBJECT tag. |
| IActiveScriptParse | No | Ability to add script text, evaluate expressions, and the like. |

Support for the IActiveScriptParse interface is optional. However, if the IActiveScriptParse interface is not supported, the script engine 101 must implement one of the IPersist* interfaces in order to load a given script.

Certain interpreted script languages (for example, VBScript) running in specific scripting host environments (for example, Internet Explorer) may rarely (or never) be called upon to save or restore a script state through IPersist*. Instead, IActiveScriptParse is used by calling IActiveScriptParse::InitNew to create a blank script, then scriptlets are added and connected to events with the function IActiveScriptParse::AddScriptlet and general code is added via IActiveScriptParse::ParseScriptText. Nonetheless, a scripting engine 101 should fully implement at least one IPersist* scheme (preferably IPersistStreamInit), because other scripting host applications may try to make use of them.

Registry Standard

An ActiveX scripting engine can identify itself as such using component categories. The ActiveX Scripting program currently defines two component

| Category | Description |
| --- | --- |
| CATID_ActiveSport | Indicates that the class identifiers (CLSIDs) are ActiveX scripting engines that support, at a minimum, IactiveScript and a persistence mechanism, such as IpersistStorage, IPersist-StreamInit, or IPersistPropertyBag. |

-continued

| Category | Description |
| --- | --- |
| CATID_ActiveScriptParse | Indicates that the CLSIDs are ActiveX scripting engines that support, at a minimum, IActiveScript and IActiveScriptParse. |

Although IActiveScriptParse is not a true persistence mechanism, it does support an InitNew method that is functionally equivalent to IPersist*::InitNew.

Script Engine States

At any given time, an ActiveX scripting engine can be in one of several states, as noted in the following:

| State | Description |
| --- | --- |
| Uninitialized | The script has not been initialized or loaded using an IPersist* interface, or does not have an IActiveScriptSite set. The scripting engine is generally not usable from this state until the scripting host takes steps to initialize the scripting engine. |
| Initialized | The script has been initialized with an IPersist* interface and has an IActiveScriptSite set, but is not connected to host objects and sinking events. Note that this state simply means that Ipersist*::Load, IPersist*::InitNew, or IactiveScriptParse::InitNew has been completed, and IActiveScript::SetScriptSite has been called. The scripting engine cannot run code in this mode. The scripting engine queues code that the scripting host passes to it through the function IActiveScriptParse::ParseScriptText, and executes the code after transitioning to the started state. |
| Started | The transition from the initialized state to started state causes the scripting engine to execute any code that was queued in the initialized state. The scripting engine can execute code while in the started state, but it is not connected to events of the objects added through IActiveScript::AddNamedItem. The scripting engine can execute code by calling the IDispatch interface which is obtained from the function IActiveScript::GetScriptDispatch, or by calling the function IActiveScriptParse::ParseScriptText. It is possible that further background initialization (progressive loading) is still ongoing, and that calling SetScriptState with the SCRIPTSTATE_CONNECTED value may cause the script to block until initialization is complete. |
| Connected | The script is loaded and connected for sinking events from scripting host objects. |
| Disconnected | The script is loaded and has a run-time state, but is temporarily disconnected from sinking events from scripting host objects. This state is distinguished from the initialized state in that the transition to this state does not cause the script to reset, the run-time state of the script is not reset, and a script initialization procedure is not executed. |
| Closed | The script has been closed. The scripting engine no longer works and returns errors for most methods. |

Figure 2:
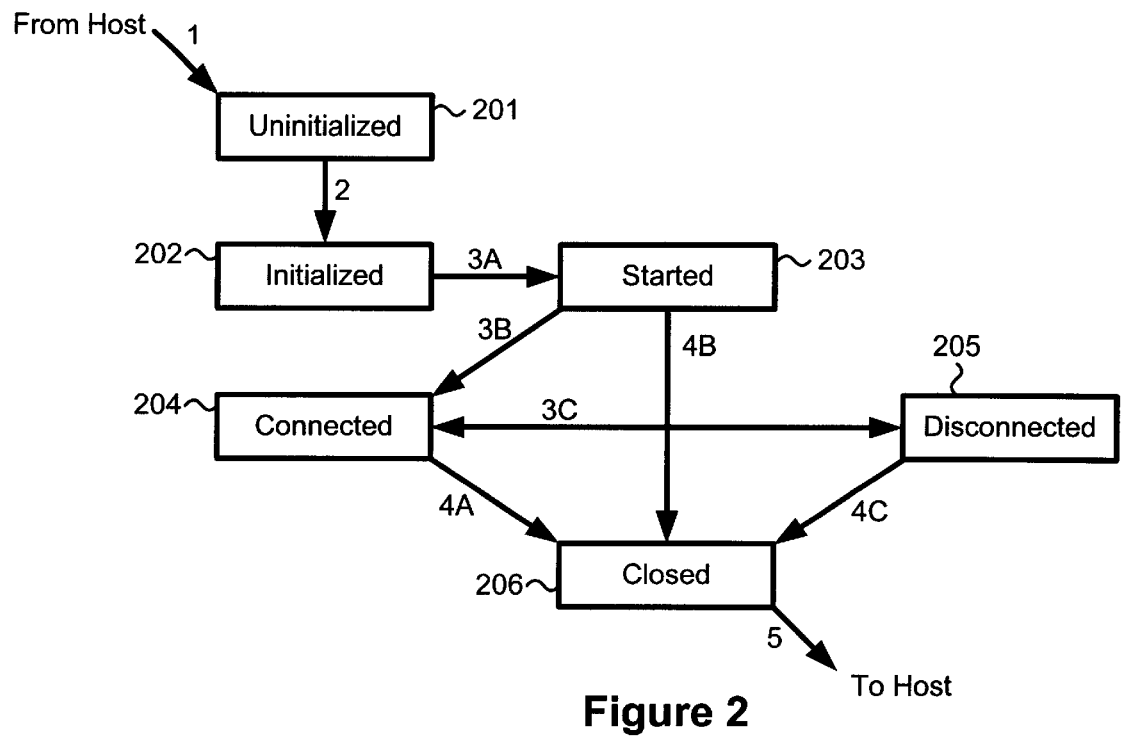
FIG. 2 illustrates in block diagram form the relationships and interactions between the various scripting engine states.
Figure 3:
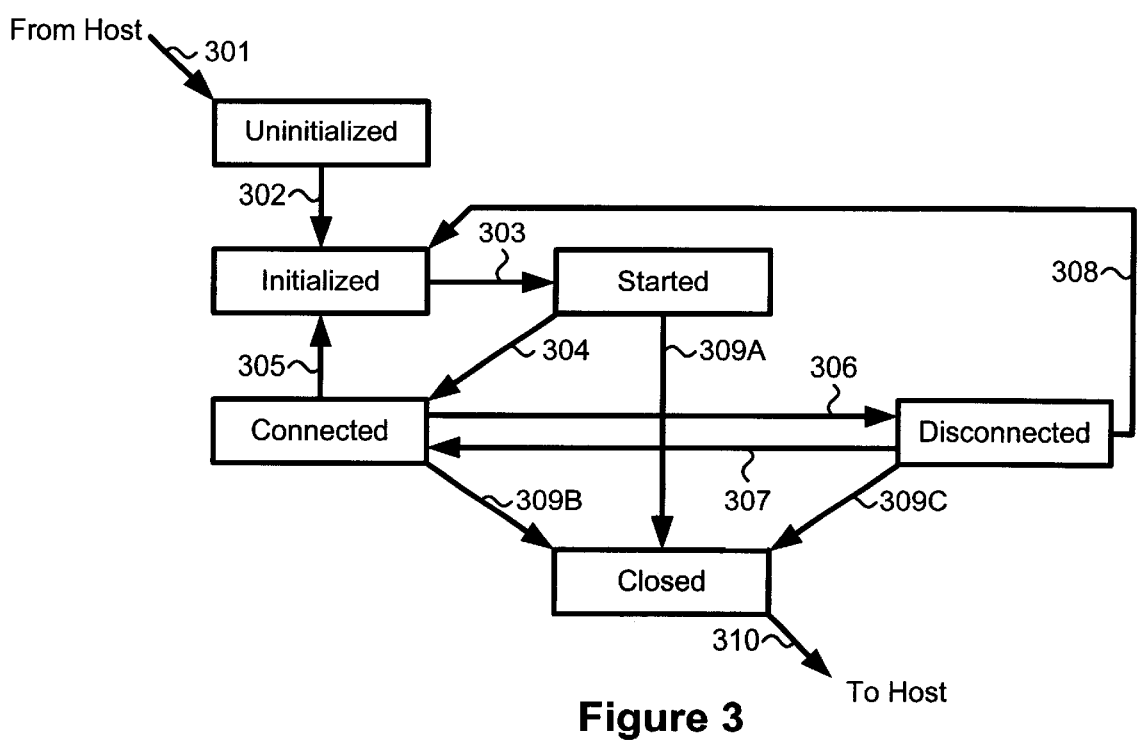
FIG. 3 illustrates in flow diagram form the actions and steps that the scripting engine takes during the various state transitions.

The functions of these states and their interrelationship is disclosed in the following description of FIGS. 2 and 3. FIG. 2 illustrates in block diagram form the relationships and interactions between the various scripting engine states. FIG. 3 illustrates in flow diagram form the actions and steps that the scripting engine takes during the various state transitions.

At step 301 in FIG. 3, the scripting engine instance 101 is created by the scripting host 105 and reserved for future use via execution path 1 in FIG. 2 where the scripting engine 101 is placed in the uninitialized state. The 10 scripting engine 101 executes the functions passed at item 1 in FIG. 2:

GO Create Instance ( )

IActiveScript::Clone ( )

to enter the initialized state. The scripting host 105 at step 302 loads data into the scripting engine 101 from data storage or initializes the scripting engine 101 to accept scriptlets. At step 303, the scripting engine 101 runs the function "Main( )", to enter the started state where the scripting engine 101 proceeds to hook up events at step 304 in the connected state. Once the events are hooked up, the scripting engine 101 reenters the initialized state at step 305 to destroy the run time state and unhook the events at step 306. The scripting engine 101 in this process executes the functions passed at item 2 in FIG. 2:

IPersist*::Load( ) or

IPersist*::InitNew( ) or

IActiveScriptParse::IniNew( ) and

IActiveScript::SetScriptSite( )

The scripting engine 101 is now in the disconnected state and at step 307 begins the execution of its defined function by rehooking events and executing the defined function. The scripting engine 101 receives, interprets and executes the code that is passed to it by the scripting host 105, in response to script input in the application. The functions that are passed in item 3 of FIG. 2 and executed in this step comprise:

IActiveScript::SetScriptState( )

The scripting engine 101 at step 308 completes the execution of the received code and executes the function passed at item 4 in FIG. 2:

IActiveScript: :Close( )

The scripting engine 101 at step 308 destroys the run time state and at step 309 unhooks events, releases all held interface pointers and frees the allocated resources. At step 310, the scripting engine 101 is released and ceases operation until it is again activated by the scripting host 105. The final function executed by the script engine 101 and passed on path 5 in FIG. 2 to the scripting host 105 at this step is:

Release( ).

This completes the creation and operation of the scripting engine 101.

Appendix A

Interfaces and Methods

Previous Contents | Index | Home | Next

ActiveX Scripting

Interfaces and Methods

IActiveScript

The scripting engine must implement the IActiveScript interface in order to be an ActiveX Scripting engine.

Methods in Vtable Order
IUnknown methods Description
| | |
|---|---|
| QueryInterface | Returns pointers to supported interfaces. |
| AddRef | Increments the reference count. |
| Release | Decrements the reference count. |

IActiveScript methods  Description
| | |
|---|---|
| SetScriptSite | Informs the scripting engine of the IActiveScriptSite site provided by the host. |
| GetScriptSite | Retrieves the site object associated with the ActiveX Scripting engine. |
| SetScriptState | Puts the scripting engine into the given state. |
| GetScriptState | Retrieves the current state of the scripting engine. |
| Close | Causes the scripting engine to abandon any currently loaded script, lose its state, and release any interface pointers it has to other objects, thus entering a closed state. |
| AddNamedItem | Adds the name of a root-level item to the scripting engine's name space. |
| AddTypeLib | Adds a type library to the name space for the script. |
| GetScriptDispatch | Retrieves the IDispatch interface for the methods and properties associated with the running script itself. |
| GetCurrentScriptThreadID | Retrieves a scripting-engine-defined identifier for the currently executing thread. |
| GetScriptThreadID | Retrieves a scripting-engine-defined identifier for the thread associated with the given Microsoft Win32® thread. |
| GetScriptThreadState | Retrieves the current state of a script thread. |
| InterruptScriptThread | Interrupts the execution of a running script thread. |
| Clone | Clones the current scripting engine (minus any current execution state), returning a loaded, unsited scripting engine in the current thread. |

IActiveScript::AddNamedItem

```
HRESULT AddNamedItem(
    LPCOLESTR pstrName,   // address of item name
    DWORD dwFlags         // item flags
);
```

Adds the name of a root-level item to the scripting engine's name space. A root-level item is an object with properties and methods, an event source, or both.

http://www.microsoft.com/workshop/prog/sdk/docs/olescrpt/axscr006.htm     3/6/97

Interfaces and Methods                                                Page 2 of 21

*pstrName*
    [in] Address of a buffer that contains the name of the item as viewed from the script.
    The name must be unique and persistable.
*dwFlags*
    [in] Flags associated with item. Can be a combination of these values:

| Value | Meaning |
| --- | --- |
| SCRIPTITEM_ISPERSISTENT | Indicates that the item should be saved if the scripting engine is saved. Similarly, setting this flag indicates that a transition back to the initialized state should retain the item's name and type information (the scripting engine must, however, release all pointers to interfaces on the actual object). |
| SCRIPTITEM_ISSOURCE | Indicates that the item sources events that the script can sink. Children (properties of the object that are in themselves objects) can also source events to the script. This is not recursive, but it provides a convenient mechanism for the common case, for example, of adding a container and all of its member controls. |
| SCRIPTITEM_ISVISIBLE | Indicates that the item's name is available in the name space of the script, allowing access to the properties, methods, and events of the item. Because by convention the properties of the item include the item's children, all child object properties and methods (and their children, recursively) will be accessible. |
| SCRIPTITEM_GLOBALMEMBERS | Indicates that the item is a collection of global properties and methods associated with the script. Normally, a scripting engine would ignore the object name (other than for the purpose of using it as a cookie for IActiveScriptSite::GetItemInfo, or for resolving explicit scoping) and expose its members as global variables and methods. This allows the host to extend the library (run-time functions and so on) available to the script. It is left to the scripting engine to deal with name conflicts (for example, when two SCRIPTITEM_GLOBALMEMBERS items have methods of the same name), although an error should not be returned because of this situation. |
| SCRIPTITEM_NOCODE | Indicates that the item is simply a name being added to the script's name space, and should not be treated as an item for which code should be associated. For example, without this flag being set, VBScript will create a separate module for the named item, and C++ might create a separate wrapper class for the named item. |
| SCRIPTITEM_CODEONLY | Indicates that the named item represents a code-only object, and that the host has no IUnknown to be associated with this code-only object. The host only has a name for this object. In object-oriented languages such as C++, this flag would create a class. Not all languages support this flag. |

Returns
S_OK            The named item was successfully added to the script's name space.
E_UNEXPECTED The call was not expected (for example, the scripting engine has not yet http://www.microsoft.com/workshop/prog/sdk/docs/olescrpt/axscr006.htm      3/6/97

Interfaces and Methods

|  |  |
|---|---|
| | been loaded or initialized). |
| E_POINTER | An invalid pointer was specified. |
| E_INVALIDARG | An argument was invalid. |

See also IActiveScriptSite::GetItemInfo

IActiveScript::AddTypeLib

```
HRESULT AddTypeLib(
    REFGUID guidTypeLib,   // LIBID of type library
    DWORD dwMaj,           // major version number
    DWORD dwMin,           // minor version number
    DWORD dwFlags          // option flags
);
```

Adds a type library to the name space for the script. This is similar to the #include directive in C/C++. It allows a set of predefined items such as class definitions, typedefs, and named constants to be added to the run-time environment available to the script.

*guidTypeLib*
    [in] LIBID of the type library to add.
*dwMaj*
    [in] Major version number.
*dwMin*
    [in] Minor version number.
*dwFlags*
    [in] Option flags. Can be SCRIPTTYPELIB_ISCONTROL, which indicates that the type library describes an ActiveX control used by the host.

Returns

| | |
|---|---|
| S_OK | The specified type library was successfully added. |
| E_UNEXPECTED | The call was not expected (for example, the scripting engine has not yet been loaded or initialized). |
| TYPE_E_CANTLOADLIBRARY | The specified type library could not be loaded. |
| E_INVALIDARG | An argument was invalid. |

IActiveScript::Clone

```
HRESULT Clone(
    IActiveScript **ppscript   // receives pointer to IActiveScript
);
```

Clones the current scripting engine (minus any current execution state), returning a loaded, unsited scripting engine in the current thread. The state of this new scripting engine should be identical to the state the original scripting engine would be in if it were transitioned back to the initialized state.

*ppscript*
    [out] Address of a variable that receives a pointer to the IActiveScript interface of the unsited, cloned scripting engine. The host must create a site and call SetScriptSite on the new scripting engine before it will be in the initialized state and, therefore, usable.

The Clone method is an optimization of **IPersist*::Save, CoCreateInstance, and IPersist*::Load**, so the state of the new scripting engine should be the same as if the state of the original scripting engine were saved and loaded into a new scripting engine. Named items are duplicated in the cloned scripting engine, but specific object pointers for each item are forgotten and are obtained with GetItemInfo. This allows an identical object model with per-thread entry points (an apartment model) to be used.

Interfaces and Methods

This method is used for multithreaded server hosts that can run multiple instances of the same script. The scripting engine may return E_NOTIMPL, in which case the host can achieve the same result by duplicating the persistent state and creating a new instance of the scripting engine with IPersist*.

This method can be called from non-base threads without resulting in a non-base callout to host objects or to IActiveScriptSite.

Returns
S_OK          The scripting engine was successfully cloned.
E_NOTIMPL     The Clone method is not supported.
E_POINTER     An invalid pointer was specified.
E_UNEXPECTED  The call was not expected (for example, the scripting engine has not yet been loaded or initialized).

See also IActiveScript::SetScriptSite, IActiveScriptSite, IActiveScriptSite::GetItemInfo

IActiveScript::Close

```
HRESULT Close(void);
```

Causes the scripting engine to abandon any currently loaded script, lose its state, and release any interface pointers it has to other objects, thus entering a closed state. Event sinks, immediately executed script text, and macro invocations that are already in progress are completed before the state changes (use InterruptScriptThread to cancel a running script thread). This method must be called by the creating host before it calls Release to prevent circular reference problems.

Returns
S_OK              The script was successfully closed.
S_FALSE           The method succeeded, but the script was already closed.
OLESCRIPT_S_PENDING The method was queued successfully, but the state hasn't changed yet. When the state changes, the site will be called back on IActiveScriptSite::OnStateChange.
E_UNEXPECTED      The call was not expected (for example, the scripting engine was already in the closed state).

See also IActiveScript::InterruptScriptThread, IActiveScriptSite::OnStateChange

IActiveScript::GetCurrentScriptThreadID

```
HRESULT GetCurrentScriptThreadID(
    SCRIPTTHREADID *pstidThread  // receives scripting thread identifier
);
```

Retrieves a scripting-engine-defined identifier for the currently executing thread. The identifier can be used in subsequent calls to script thread execution-control methods such as InterruptScriptThread.

*pstidThread*
[out] Address of a variable that receives the script thread identifier associated with the current thread. The interpretation of this identifier is left to the scripting engine, but it can be just a copy of the Windows thread identifier. If the Win32 thread terminates, this identifier becomes unassigned and can subsequently be assigned to another thread.

This method can be called from non-base threads without resulting in a non-base callout to host objects or to IActiveScriptSite.

http://www.microsoft.com/workshop/prog/sdk/docs/olescrpt/axscr006.htm    3/6/97

Interfaces and Methods

Returns
S_OK        The identifier was successfully retrieved.
E_POINTER   An invalid pointer was specified.

See also IActiveScript::InterruptScriptThread, IActiveScriptSite

IActiveScript::GetScriptDispatch

```
HRESULT GetScriptDispatch(
    LPCOLESTR pstrItemName   // address of item name
    IDispatch **ppdisp       // receives IDispatch pointer
);
```

Retrieves the IDispatch interface for the methods and properties associated with the running script itself.

*pstrItemName*
   [in] Address of a buffer that contains the name of the item for which the caller needs the associated dispatch object. If this parameter is NULL, the dispatch object contains as its members all of the global methods and properties defined by the script. Through the IDispatch interface and the associated ITypeInfo interface, the host can invoke script methods or view and modify script variables.
*ppdisp*
   [out] Address of a variable that receives a pointer to the object associated with the script's global methods and properties. If the scripting engine does not support such an object, NULL is returned.

Because methods and properties can be added by calling IActiveScriptParse, the IDispatch interface returned by this function can dynamically support new methods and properties. Similarly, IDispatch::GetTypeInfo should return a new, unique ITypeInfo when methods and properties are added. Note, however, that language engines must not change the IDispatch interface in a way that is incompatible with any previous ITypeInfo interface returned. That implies, for example, that DISPIDs will never be reused.

Returns
S_OK           The dispatch object for the script was successfully retrieved.
S_FALSE        The scripting engine does not support a dispatch object; the *ppdisp* parameter is set to NULL.
E_UNEXPECTED   The call was not expected (for example, the scripting engine has not yet been loaded or initialized).
E_POINTER      An invalid pointer was specified.
E_INVALIDARG   An argument was invalid.

IActiveScript::GetScriptSite

```
HRESULT GetScriptSite(
    REFIID iid,              // interface identifier
    void **ppvSiteObject     // address of host site interface
);
```

Retrieves the site object associated with the ActiveX Scripting engine.

*iid*
   [in] Identifier of the requested interface.
*ppvSiteObject*
   [out] Address of the location that receives the interface pointer to the host's site object.

http://www.microsoft.com/workshop/prog/sdk/docs/olescrpt/axscr006.htm        3/6/97

Interfaces and Methods

Returns

| | |
|---|---|
| S_OK | The site object was successfully retrieved. |
| S_FALSE | No site has been set; *ppvSiteObject* is set to NULL. |
| E_POINTER | An invalid pointer was specified. |
| E_INVALIDARG | An argument was invalid. |
| E_NOINTERFACE | The specified interface is not supported. |

IActiveScript::GetScriptState

```
HRESULT GetScriptState(
    SCRIPTSTATE *pss   // address of structure for state information
);
```

Retrieves the current state of the scripting engine. This method can be called from non-base threads without resulting in a non-base callout to host objects or to IActiveScriptSite.

*pss*
   [out] Address of a variable that receives a value defined in the SCRIPTSTATE enumeration. The value indicates the current state of the scripting engine associated with the calling thread.

Returns

| | |
|---|---|
| S_OK | The state information was successfully retrieved. |
| E_POINTER | An invalid pointer was specified. |

See also IActiveScriptSite, SCRIPTSTATE

IActiveScript::GetScriptThreadID

```
HRESULT GetScriptThreadID(
    DWORD dwWin32ThreadID,         // Win32 thread identifier
    SCRIPTTHREADID *pstidThread    // receives scripting thread identifier
);
```

Retrieves a scripting-engine-defined identifier for the thread associated with the given Win32 thread. This identifier can be used in subsequent calls to script thread execution control methods such as InterruptScriptThread.

*dwWin32ThreadID*
   [in] Thread identifier of a running Win32 thread in the current process. Use the GetCurrentScriptThreadID function to retrieve the thread identifier of the currently executing thread.

*pstidThread*
   [out] Address of a variable that receives the script thread identifier associated with the given Win32 thread. The interpretation of this identifier is left to the scripting engine, but it can be just a copy of the Windows thread identifier. Note that if the Win32 thread terminates, this identifier becomes unassigned and may subsequently be assigned to another thread.

This method can be called from non-base threads without resulting in a non-base callout to host objects or to IActiveScriptSite.

Returns

| | |
|---|---|
| S_OK | The identifier was successfully retrieved. |
| E_POINTER | An invalid pointer was specified. |
| E_UNEXPECTED | The call was not expected (for example, the scripting engine has not yet been loaded or initialized). | http://www.microsoft.com/workshop/prog/sdk/docs/olescrpt/axscr006.htm            3/6/97

Interfaces and Methods

See also IActiveScript::InterruptScriptThread, IActiveScriptSite

IActiveScript::GetScriptThreadState

```
HRESULT GetScriptThreadState(
    SCRIPTTHREADID stidThread,     // identifier of script thread
    SCRIPTTHREADSTATE *pstsState   // receives state flag
);
```

Retrieves the current state of a script thread.

*stidThread*
    [in] Identifier of the thread for which the state is desired, or one of the following special thread identifiers:

| Value | Meaning |
|---|---|
| SCRIPTTHREADID_CURRENT | The currently executing thread. |
| SCRIPTTHREADID_BASE | The base thread; that is, the thread in which the scripting engine was instantiated. |

*pstsState*
    [out] Address of a variable that receives the state of the indicated thread. The state is indicated by one of the named constant values defined by the SCRIPTTHREADSTATE enumeration. If this parameter does not identify the current thread, the state may change at any time.

This method can be called from non-base threads without resulting in a non-base callout to host objects or to IActiveScriptSite.

Returns

| | |
|---|---|
| S_OK | The current state was successfully retrieved. |
| E_POINTER | An invalid pointer was specified. |
| E_UNEXPECTED | The call was not expected (for example, the scripting engine has not yet been loaded or initialized). |

See also IActiveScriptSite, SCRIPTTHREADSTATE

IActiveScript::InterruptScriptThread

```
HRESULT InterruptScriptThread(
    SCRIPTTHREADID   stidThread,    // identifier of thread
    const EXCEPINFO *pexcepinfo,    // receives error information
    DWORD dwFlags
);
```

Interrupts the execution of a running script thread (an event sink, an immediate execution, or a macro invocation). This method can be used to terminate a script that is stuck (for example, in an infinite loop). It can be called from non-base threads without resulting in a non-base callout to host objects or to IActiveScriptSite.

*stidThread*
    [in] Thread identifier of the thread to interrupt, or one of the following special thread identifier values:

| Value | Meaning |
|---|---|
| SCRIPTTHREADID_CURRENT | The currently executing thread. |
| SCRIPTTHREADID_BASE | The base thread; that is, the thread in which the scripting engine was instantiated. |
| SCRIPTTHREADID_ALL | All threads. The interrupt is applied to all script methods |

Interfaces and Methods currently in progress. Note that unless the caller has requested that the script be disconnected, by calling SetScriptState with the SCRIPTSTATE_DISCONNECTED or SCRIPTSTATE_INITIALIZED flag, the next scripted event causes script code to run again.

*pexcepinfo*
    [in] Address of an EXCEPINFO structure that receives error information associated with the error condition.

*dwFlags*
    [in] Option flags associated with the interruption. Can be one of these values:

SCRIPTINTERRUPT_DEBUG
        If supported, enter the scripting engine's debugger at the current script execution point.

SCRIPTINTERRUPT_RAISEEXCEPTION
        If supported by the scripting engine's language, let the script handle the exception. Otherwise, the script method is aborted and the error code is returned to the caller; that is, the event source or macro invoker.

Returns
| | |
|---|---|
| S_OK | The given thread was successfully interrupted. |
| E_POINTER | An invalid pointer was specified. |
| E_INVALIDARG | An argument was invalid. |
| E_UNEXPECTED | The call was not expected (for example, the scripting engine has not yet been loaded or initialized). |

See also IActiveScript::SetScriptState, IActiveScriptSite

IActiveScript::SetScriptSite

```
HRESULT SetScriptSite(
    IActiveScriptSite *pScriptSite   // address of host script site
);
```

Informs the scripting engine of the IActiveScriptSite site provided by the host. This method must be called before any other IActiveScript methods can be used.

*pScriptSite*
    [in] Address of the host-supplied script site to be associated with this instance of the scripting engine. The site must be uniquely assigned to this scripting engine instance; it cannot be shared with other scripting engines.

Returns
| | |
|---|---|
| S_OK | The host site was set successfully. |
| E_POINTER | An invalid pointer was specified. |
| E_INVALIDARG | An argument was invalid. |
| E_FAIL | An unspecified error occurred; the scripting engine was unable to finish initializing the site. |
| E_UNEXPECTED | The call was not expected (for example, a site was already set). |

See also IActiveScriptSite

IActiveScript::SetScriptState

```
HRESULT SetScriptState(
    SCRIPTSTATE ss   // identifier of new state
``` http://www.microsoft.com/workshop/prog/sdk/docs/olescrpt/axscr006.htm    3/6/97

Interfaces and Methods

);

Puts the scripting engine into the given state. This method can be called from non-base threads without resulting in a non-base callout to host objects or to IActiveScriptSite.

ss
[in] Sets the scripting engine to the given state. Can be one of the values defined in the SCRIPTSTATE enumeration:

SCRIPTSTATE_INITIALIZED
Returns the scripting engine back to the initialized state from the started, connected, or disconnected state. Because languages can vary widely in semantics, scripting engines are not required to support this state transition. Engines that support IActiveScript::Clone must, however, support this state transition. Hosts must prepare for this transition and take the appropriate action: Release the current scripting engine, create a new scripting engine, and call Load or InitNew (and possibly also call ParseScriptText). Use of this transition should be considered an optimization of the above steps. Note that any information the scripting engine has obtained about the names of Named Items and the type information describing Named Items remains valid.

Because languages vary widely, defining the exact semantics of this transition is difficult. At a minimum, the scripting engine must disconnect from all events, and release all of the SCRIPTINFO_IUNKNOWN pointers obtained by calling IActiveScriptSite::GetItemInfo. The engine must refetch these pointers after the script is run again. The scripting engine should also reset the script back to an initial state that is appropriate for the language. VBScript, for example, resets all variables and retains any code added dynamically by calling IActiveScriptParse with the SCRIPTTEXT_ISPERSISTENT flag set. Other languages may need to retain current values (such as Lisp because there is no code/data separation) or reset to a well-known state (this includes languages with statically initialized variables). These languages may or may not retain code added by calling IActiveScriptParse.

Note that the transition to the started state should have the same semantics (that is, it should leave the scripting engine in the same state) as calling **IPersist*::Save to save the scripting engine, and then calling IPersist*::Load to load a new scripting engine; these actions should have the same semantics as IActiveScript::Clone. Scripting engines that do not yet support Clone or IPersist* should carefully consider how the transition to the started state should behave, so that such a transition would not violate the above conditions if Clone or IPersist*** support was later added.

During this transition to the started state, the scripting engine will disconnect from event sinks after the appropriate destructors, and so on, are executed in the script. To avoid having these destructors executed, the host can first move the script into the disconnected state before moving into the started state.

Use InterruptScriptThread to cancel a running script thread without waiting for current events, and so on, to finish running.

SCRIPTSTATE_STARTED
The transition to this mode causes any code that was queued during the initialized state to be executed. From this state, script code can be executed, for example, by calling IActiveScriptParse::ParseScriptText or by calling the IDispatch interface obtained from IActiveScript::GetScriptDispatch. The transition to this state is also the appropriate time to execute routines such as a main()-like script routine, if appropriate for the script language.

SCRIPTSTATE_CONNECTED http://www.microsoft.com/workshop/prog/sdk/docs/olescrpt/axscr006.htm        3/6/97

Interfaces and Methods                                              Page 10 of 21

> Causes the script to connect to events. If this is a transition from the initialized state, the scripting engine should transition through the started state, performing the necessary actions, before entering the connected state and connecting to events.
>
> SCRIPTSTATE_DISCONNECTED
> Causes the script to disconnect from event sinks. This can be done either *logically* (ignoring events received) or *physically* (calling Unadvise on the appropriate connection points). Returning to the connected state reverses this process. If this is a transition from the initialized state, the scripting engine should transition through the started state, performing the necessary actions, before entering the disconnected state. Event sinks that are in progress are completed before the state changes (use InterruptScriptThread to cancel a running script thread). The script's execution state is maintained. For example, an HTML browser may put the scripting engine into this state when a scripted HTML page is moved into the LRU cache, before the page is actually destroyed.

Returns

| | |
|---|---|
| S_OK | The script successfully entered the given state. |
| S_FALSE | The method succeeded, but the script was already in the given state. |
| OLESCRIPT_S_PENDING | The method was queued successfully, but the state hasn't changed yet. When the state changes, the site will be called back through the IActiveScriptSite::OnStateChange method. |
| E_FAIL | The scripting engine does not support the transition back to the initialized state. The host must discard this scripting engine and create, initialize, and load a new scripting engine to achieve the same effect. |
| E_UNEXPECTED | The call was not expected (for example, the scripting engine has not yet been loaded or initialized). |

See also IActiveScript::Clone, IActiveScript::GetScriptDispatch, IActiveScript::InterruptScriptThread, IActiveScriptParse::ParseScriptText, IActiveScriptSite, IActiveScriptSite::GetItemInfo, IActiveScriptSite::OnStateChange, SCRIPTSTATE

IActiveScriptParse

If the ActiveX Scripting engine allows raw text code scriptlets to be added to the script, or allows expression text to be evaluated at run time, it implements IActiveScriptParse. For interpreted scripting languages that have no independent authoring environment, such as Visual Basic Script, this provides an alternate mechanism (other than IPersist*) to get script code into the scripting engine, and to attach script fragments to various object events.

Methods in Vtable Order

| IUnknown methods | Description |
|---|---|
| QueryInterface | Returns pointers to supported interfaces. |
| AddRef | Increments the reference count. |
| Release | Decrements the reference count. |
| IActiveScriptParse methods | Description |
| InitNew | Initializes the scripting engine. |
| AddScriptlet | Adds a code scriptlet to the script. |
| ParseScriptText | Parses the given code scriptlet, adding declarations into the name space and evaluating code as appropriate. |

IActiveScriptParse::AddScriptlet http://www.microsoft.com/workshop/prog/sdk/docs/olescrpt/axscr006.htm        3/6/97

Interfaces and Methods

```
HRESULT AddScriptlet(
    LPCOLESTR pstrDefaultName,    // address of default name of scriptlet
    LPCOLESTR pstrCode,           // address of scriptlet text
    LPCOLESTR pstrItemName,       // address of item name
    LPCOLESTR pstrSubItemName,    // address of subitem name
    LPCOLESTR pstrEventName,      // address of event name
    LPCOLESTR pstrEndDelimiter ,  // address of end-of-scriptlet delimiter
    DWORD dwFlags,                // scriptlet flags
    BSTR *pbstrName,              // address of actual name of scriptlet
    EXCEPINFO *pexcepinfo         // address of exception information
);
```

Adds a code scriptlet to the script. This method is used in environments where the persistent state of the script is intertwined with the host document and must be restored under the host's control, rather than through IPersist\*. The primary examples are HTML scripting languages that allow scriptlets of code embedded in the HTML document to be attached to intrinsic events (for example, ONCLICK="button1.text='Exit'").

*pstrDefaultName*
  [in] Address of a default name to associate with the scriptlet. If the scriptlet does not contain naming information (as in the ONCLICK example above), this name will be used to identify the scriptlet. If this parameter is NULL, the scripting engine manufactures a unique name, if necessary.

*pstrCode*
  [in] Address of the scriptlet text to add. The interpretation of this string depends on the scripting language.

*pstrItemName*
  [in] Address of a buffer that contains the item name associated with this scriptlet. This parameter, in addition to *pstrSubItemName*, identifies the object for which the scriptlet is an event handler.

*pstrSubItemName*
  [in] Address of a buffer that contains the name of a subobject of the named item with which this scriptlet is associated; this name must be found in the named item's type information. This parameter is NULL if the scriptlet is to be associated with the named item instead of a subitem. This parameter, in addition to *pstrItemName*, identifies the specific object for which the scriptlet is an event handler.

*pstrEventName*
  [in] Address of a buffer that contains the name of the event for which the scriptlet is an event handler.

*pstrEndDelimiter*
  [in] Address of the end-of-scriptlet delimiter. When *pstrCode* is parsed from a stream of text, the host typically uses a delimiter, such as two single quotation marks ("), to detect the end of the scriptlet. This parameter specifies the delimiter that the host used, allowing the scripting engine to provide some conditional primitive preprocessing (for example, replacing a single quotation mark ['] with two single quotation marks for use as a delimiter). Exactly how (and if) the scripting engine makes use of this information depends on the scripting engine. Set this parameter to NULL if the host did not use a delimiter to mark the end of the scriptlet.

*dwFlags*
  [in] Flags associated with the scriptlet. Can be a combination of the following values:

Value Meaning
  SCRIPTTEXT_ISVISIBLE Indicates that the script text should be visible (and, therefore, callable by name) as a global method in the name space of the script.
  SCRIPTTEXT_ISPERSISTENT Indicates that the code added during this call should be saved if the scripting engine is saved (for example, through a call to **IPersist\*::Save**), or if the scripting engine is reset

What is claimed is:

1. A method for interconnecting an application process with a scripting engine to execute a script for said application process, the method comprising:
   based upon a script type of a script, determining an appropriate scripting engine for executing said script from among plural different scripting engines available to an application process, each of said plural different scripting engines for executing scripts of a different script type;
   creating an instance of said appropriate scripting engine;
   populating said appropriate scripting engine instance with said script;
   running said appropriate scripting engine instance to execute said script.

2. The method of claim 1 wherein said creating comprises:
   installing a predefined scripting engine interface in said appropriate scripting engine instance; and
   installing a predefined application scripting interface, which complements said predefined scripting engine interface, in said application process.

3. The method of claim 1 wherein said appropriate scripting engine interconnects with any suitably written application process, absent knowledge of the details of that application process.

4. The method of claim 1 wherein said running comprises:
   automating by said appropriate scripting engine one or more exposed objects according to an automation model.

5. The method of claim 1 further comprising:
   adding aggregatable script by run-time evaluation with respect to an exposed automatable object.

6. The method of claim 2 wherein said populating comprises:
   transmitting messages from said application process to said scripting engine interface indicating one or more named items.

7. The method of claim 6 wherein said running comprises:
   activating, in said appropriate scripting engine instance, a predefined response for an event for which one of the one or more named items is an event source.

8. A computer system with a host that allows programmatic control by an arbitrary engine executing a script, the system comprising:
   a host including instructions for evaluating a script to determine an appropriate engine for executing the script to programmatically control an automation model exposed by the host, the host further including instructions for registering the script with the appropriate engine; and
   one or more engine-independent methods supported on the host for interconnecting the host with the appropriate engine, said one or more engine-independent methods allowing interconnection between the host and any one or more of plural different engines, each of the plural different engines for executing scripts of a different script type.

9. The computer system of claim 8 wherein the one or more engine-independent methods include:
   a type information retrieval method callable to obtain type information for the automation model exposed by the host.

10. The computer system of claim 8 wherein the one or more engine-independent methods include:
    a start notification method callable to indicate to the host that the engine has begun executing the script;
    a terminate notification method callable to indicate to the host that the engine has finished executing the script; and
    an error notification method callable to indicate to the host that an execution error occurred during execution of the script.

11. A computer system with an engine for executing a script to programmatically control an arbitrary host, the system comprising:
    an engine including instructions for executing a script to programmatically control one or more automatable features exposed through a host;
    a host-independent script loading method supported on the engine callable to cause script loading by the engine; and
    a host-independent state change method supported on the engine callable to put the engine into a given state.

12. The computer system of claim 11 wherein the host-independent script loading method takes as a parameter a reference to a location in persistent storage, whereby the engine loads a script based upon the reference.

13. The computer system of claim 11 wherein the host-independent script loading method passes aggregatable script from the host to the engine for run-time evaluation.

14. The computer system of claim 11 further comprising:
    a host-independent automatable feature adding method callable to register with the engine one or more automatable features.

15. The computer system of claim 11 further comprising:
    a host-independent type information adding method callable to register with the engine type information for one or more automatable features.

16. The computer system of claim 11 further comprising:
    a host-independent automation script site registration method callable to register with the engine an automation script site.

17. The computer system of claim 13 further comprising:
    a host-independent automatable feature adding method callable to register with the engine one or more automatable features, wherein the passed aggregatable script is evaluated with respect to an added automatable feature.

18. A method for a host to initialize an arbitrary engine to execute a script for the host, the method comprising:
    exposing by a host one or more automatable features for programmatic control by an engine executing a script;
    based upon a script type for a script, selecting by the host an engine for executing the script from among plural different engines available to the host, each of the plural different engines for executing scripts of a different script type;
    causing by the host creation of the selected engine;
    causing by the host loading of the script into the selected engine;
    initiating by the host execution of the script by the selected engine.

19. The method of claim 18 further comprising:
    registering with the selected engine one or more of the exposed automatable features; and
    registering type information for the exposed automatable features.

20. The method of claim 18 further comprising:

exposing a script call back means supported on the host for providing type information about the exposed automatable features to the selected engine; and registering the script call back means with the selected engine.

21. The method of claim 19 further comprising:

before initiating execution, sending by the host to the selected engine aggregatable script for adding to the loaded script by run-time evaluation with respect to a registered automatable feature.

22. A method for an engine to execute a script to programmatically control an arbitrary host, the method comprising:

providing an engine including instructions for executing a script;

exposing a host-independent script loading means supported on the engine for receiving a request to load a script, the script for programmatically controlling one or more automatable features exposed through a host;

exposing a host-independent scripting integration means supported on the engine for receiving information and commands from the host; and executing by the engine the script.

23. The method of claim 22 further comprising:

requesting from the host type information for the one or more automatable features.

* * * * *

UNITED STATES PATENT AND TRADEMARK OFFICE
CERTIFICATE OF CORRECTION

| | |
|---|---|
| PATENT NO. : 6,275,868 B1 | Page 1 of 19 |
| DATED : August 14, 2001 | |
| INVENTOR(S) : Fraley et al. | |

It is certified that error appears in the above-identified patent and that said Letters Patent is hereby corrected as shown below:

<u>Column 5,</u>
Line 57, "two component" should be -- two component categories: --.
Line 62, "CATID_ActiveSport" should read -- CATID_ActiveScript --.

<u>Columns 31 and 32,</u>
Bottom page, please insert:

| | |
|---|---|
| | by way of a transition back to the <u>initialized</u> state. |

*pbstrName*
[out] The actual name used to identify the scriptlet. This will be, in order of preference: a name explicitly specified in the scriptlet text, the default name provided in *pstrDefaultName*, or a unique name synthesized by the scripting engine.

*pexcepinfo*
[out] Pointer to a structure containing exception information. This structure should be filled in if DISP_E_EXCEPTION is returned.

| Returns | |
|---|---|
| S_OK | The scriptlet was successfully added to the script-- the *pbstrName* parameter contains the scriptlet's name. |
| OLESCRIPT_E_INVALIDNAME | The default name supplied is invalid in this scripting language. |
| OLESCRIPT_E_SYNTAX | An unspecified syntax error occurred in the scriptlet. |
| DISP_E_EXCEPTION | An exception occurred in the parsing of the scriptlet; the *pexcepinfo* parameter contains information about the exception. |
| E_UNEXPECTED | The call was not expected (for example, the scripting engine has not yet been loaded or |

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

|  | initialized). |
| --- | --- |
| E_NOTIMPL | This method is not supported; the scripting engine does not support adding event-sinking scriptlets. |
| E_POINTER | An invalid pointer was specified. |
| E_INVALIDARG | An argument was invalid. |

IActiveScriptParse::InitNew
HRESULT InitNew (void);

Initializes the scripting engine.

Before the scripting engine can be used, one of the following methods must be called: **IPersist\*::Load, IPersist\*::InitNew, or IActiveScriptParse::InitNew. The semantics of this method are identical to IPersistStreamInit::InitNew, in that this method tells the scripting engine to initialize itself. Note that it is not valid to call both InitNew and Load, nor is it valid to call InitNew or Load** more than once.

| Returns | |
| --- | --- |
| S_OK | The scripting engine was successfully initialized. |
| E_FAIL | An error occurred during initialization. |

IActiveScriptParse:: ParseScriptText
HRESULT ParseScriptText (
    LPCOLESTR pstrCode,     //     address of scriptlet text
    LPCOLESTR pstrItemName,     //     address of item name
    IUnknown *punkContext,     //     address of debugging context
    LPCOLESTR pstrEndDelimiter, //     address of end-of-scriptlet delimiter
    DWORD dwFlags,     //     scriptlet flags
    VARIANT *pvarResult,     //     address of buffer for results
    EXCEPINFO *pexcepinfo     //     address of buffer for error data

UNITED STATES PATENT AND TRADEMARK OFFICE
CERTIFICATE OF CORRECTION

| | | |
|---|---|---|
| PATENT NO. | : 6,275,868 B1 | Page 3 of 19 |
| DATED | : August 14, 2001 | |
| INVENTOR(S) | : Fraley et al. | |

It is certified that error appears in the above-identified patent and that said Letters Patent is hereby corrected as shown below:

);

Parses the given code scriptlet, adding declarations into the name space and evaluating code as appropriate.

*pstrCode*
    [in] Address of the scriptlet text to evaluate. The interpretation of this string depends on the scripting language.

*pstrItemName*
    [in] Address of the item name that gives the context in which the scriptlet is to be evaluated. If this parameter is NULL, the code is evaluated in the scripting engine's global context.

*punkContext*
    [in] Address of context object. This object is reserved for use in a debugging environment, where such a context may be provided by the debugger to represent an active run-time context. If this parameter is NULL, the engine uses *pstrItemName* to identify the context

*pstrEndDelimiter*
    [in] Address of the end-of-scriptlet delimiter. When *pstrCode is* parsed from a stream of text, the host typically uses a delimiter, such as two single quotation marks ("), to detect the end of the scriptlet. This parameter specifies the delimiter that the host used, allowing the scripting engine to provide some conditional primitive preprocessing (for example, replacing a single quotation mark ['] with two single quotation marks for use as a delimiter). Exactly how (and if) the scripting engine makes use of this information depends on the scripting engine. Set this parameter to NULL if the host did not use a delimiter to mark the end of the scriptlet.

*dwFlags*
    [in] Flags associated with the scriptlet. Can be a combination of these values:

| Value | Meaning |
|---|---|
| SCRIPTTEXT_ISEXPRESSION | If the distinction between a computational expression and a statement is important but syntactically ambiguous in the script language, this flag specifies that the scriptlet is to be interpreted as an expression, rather |

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

|  | |
|---|---|
|  | than as a statement or list of statements. By default, statements are assumed unless the correct choice can be determined from the syntax of the scriptlet text. |
| SCRIPTTEXT_ISPERSISTENT | Indicates that the code added during this call should be saved if the scripting engine is saved (for example, through a call to **IPersist\*::Save**), or if the scripting engine is reset by way of a transition back to the initialized state. |
| SCRIPTTEXT_ISVISIBLE | Indicates that the script text should be visible (and, therefore, callable by name) as a global method in the name space of the script. |

*pvarResult*
    [out] Address of a buffer that receives the results of scriptlet processing, or NULL if the caller expects no result (that is, the SCRIPTTEXT_ISEXPRESSION value is not set).

*pexcepinfo*
    [out] Address of a structure that receives exception information. This structure is filled if ParseScriptText returns DISP_E_EXCEPTION.

If the scripting engine is in the initialized state, no code will actually be evaluated during this call; rather, such code is queued and executed when the scripting engine is transitioned into (or through) the started state. Because execution is not allowed in the initialized state, it is an error to call this method with the SCRIPTTEXT_ISEXPRESSION flag when in the initialized state.

The scriptlet can be an expression, a list of statements, or anything allowed by the script language. For example, this method is used in the evaluation of the HTML <SCRIPT> tag, which allows statements to be executed as the HTML page is being constructed, rather than just compiling them into the script state.

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

The code passed to this method must be a valid, complete portion of code. For example, in VBScript it is illegal to call this method once with Sub Foo(x) and then a second time with End Sub. The parser must not wait for the second call to complete the subroutine, but rather must generate a parse error because a subroutine declaration was started but not completed.

| Returns | |
|---|---|
| S_OK | The expression or statement(s) has been evaluated. The *pvarResult* parameter contains the result, if any. |
| E_POINTER | An invalid pointer was specified. |
| E_INVALIDARG | An argument was invalid. |
| E_UNEXPECTED | The call was not expected (for example, the scripting engine is in the uninitialized or closed state, or the SCRIPTTEXT_ISEXPRESSION flag was set and the scripting engine is in the initialized state). |
| DISP_E_EXCEPTION | An exception occurred in the processing of the scriptlet. The *pexcepinfo* parameter contains information about the exception. |
| OLESCRIPT_E_SYNTAX | An unspecified syntax error occurred in the scriptlet. |
| E_NOTIMPL | This method is not supported. The scripting engine does not support run-time evaluation of expressions or statements. |

IActiveScriptError

An object implementing this interface is passed to IActiveScriptSite::OnScriptError whenever the scripting engine encounters an unhandled error. The host then calls methods on this object to obtain information about the error that occurred.

Methods in Vtable Order

| IUnknown methods | Description |
|---|---|
| QueryInterface | Returns pointers to supported interfaces. |

UNITED STATES PATENT AND TRADEMARK OFFICE
CERTIFICATE OF CORRECTION

PATENT NO.    : 6,275,868 B1
DATED         : August 14, 2001
INVENTOR(S)   : Fraley et al.

It is certified that error appears in the above-identified patent and that said Letters Patent is hereby corrected as shown below:

| AddRef | Increments the reference count. |
|---|---|
| IActiveScriptError methods | Description |
| GetExceptionInfo | Retrieves information about an error. |
| GetSourcePosition | Retrieves the location in the source code where an error occurred. |
| GetSourceLineText | Retrieves the line in the source file where an error occurred. |

IActiveScriptError::GetExceptionInfo

HRESULT GetExceptionInfo (
    EXCEPINFO *pexcepinfo    //    structure for exception information
);

Retrieves information about an error that occurred while the scripting engine was running a script.

*pexcepinfo*
    [out] Address of an EXCEPINFO structure that receives error information.

| Returns | |
|---|---|
| S_OK | The error information was successfully retrieved. |
| E_FAIL | An error occurred. |

IActiveScriptError::GetSourceLineText

HRESULT GetSourceLineText (
    BSTR *pbstrSourceLine    //    address of buffer for source line
);

Retrieves the line in the source file where an error occurred while a scripting engine was running a script.

*pbstrSourceLine*

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

[out] Address of a buffer that receives the line of source code in which the error occurred.

| Returns | |
|---|---|
| S_OK | The line in the source file was successfully retrieved. |
| E_FAIL | An error occurred. |

IActiveScriptError::GetSourcePosition

```
HRESULT GetSourcePosition (
    DWORD *pdwSourceContext,    //    context cookie
    ULONG *pulLineNumber,       //    line number of error
    LONG  *pichCharPosition     //    character position of error
);
```

Retrieves the location in the source code where an error occurred while the scripting engine was running a script.

*pdwSourceContext*
    [out] Address of a variable that receives a cookie that identifies the context. The interpretation of this parameter depends on the host application.

*pulLineNumber*
    [out] Address of a variable that receives the line number in the source file where the error occurred.

*pichCharPosition*
    [out] Address of a variable that receives the character position in the line where the error occurred.

| Returns | |
|---|---|
| S_OK | The error location was successfully retrieved. |
| E_FAIL | An error occurred. |

UNITED STATES PATENT AND TRADEMARK OFFICE
CERTIFICATE OF CORRECTION

PATENT NO.    : 6,275,868 B1
DATED         : August 14, 2001
INVENTOR(S)   : Fraley et al.

It is certified that error appears in the above-identified patent and that said Letters Patent is hereby corrected as shown below:

IActiveScriptSite

The host must create a site for the ActiveX Scripting engine by implementing IActiveScriptSite. Usually, this site will be associated with the container of all the objects that are visible to the script (for example, the ActiveX controls). Typically, this container will correspond to the document or page being viewed. Internet Explorer, for example, would create such a container for each HTML page being displayed. Each ActiveX control (or other automation object) on the page, and the scripting engine itself, would be enumerable within this container.

Methods in Vtable Order

| IUnknown methods | Description |
|---|---|
| QueryInterface | Returns pointers to supported interfaces. |
| AddRef | Increments the reference count. |
| Release | Decrements the reference count. |
| IActiveScriptSite methods | Description |
| GetLCID | Retrieves the locale identifier that the host uses for displaying user-interface elements. |
| GetItemInfo | Obtains information about an item that was added to an engine through a call to the IActiveScript::AddNamedItem method. |
| GetDocVersionString | Retrieves a host-defined string that uniquely identifies the current document version from the host's point of view. |
| OnScriptTerminate | Informs the host that the script has completed execution. |
| OnStateChange | Informs the host that the scripting engine has changed states. |
| OnScriptError | Informs the host that an execution error occurred while the engine was running the script. |
| OnEnterScript | Informs the host that the scripting engine has begun executing the script code. |

UNITED STATES PATENT AND TRADEMARK OFFICE
CERTIFICATE OF CORRECTION

PATENT NO.   : 6,275,868 B1
DATED        : August 14, 2001
INVENTOR(S)  : Fraley et al.

It is certified that error appears in the above-identified patent and that said Letters Patent is hereby corrected as shown below:

| OnLeaveScript | Informs the host that the scripting engine has returned from executing script code. |
|---|---|

IActiveScriptSite::GetDocVersionString

HRESULT GetDocVersionString (
    BSTR *pbstrVersionString   //   address of document version string
);

Retrieves a host-defined string that uniquely identifies the current document version from the host's point of view. If the related document has changed outside the scope of ActiveX Scripting (as in the case of an HTML page being edited with NotePad), the scripting engine can save this along with its persisted state, forcing a recompile the next time the script is loaded.

*pstrVersionString*
    [out] Address of the host-defined document version string.

| Returns | |
|---|---|
| S_OK | The document version string was successfully retrieved. The *pstrVersionString* parameter contains the string. |
| E_NOTIMPL | This method is not supported. The scripting engine should assume that the script is in sync with the document. |

IActiveScriptSite::GetItemInfo

HRESULT IActiveScriptSite::GetItemInfo (
    LPCOLESTR pstrName,      //   address of item name
    DWORD dwReturnMask,      //   bit mask for information retrieval
    IUnknown **ppunkItem,    //   address of pointer to item's IUnknown
    ITypeInfo **ppTypeInfo   //   address of pointer to item's ITypeInfo
):

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

Allows the scripting engine to obtain information about an item added with IActiveScript::AddNamedItem.

*pstrName*

[in] The name associated with the item, as specified in IActiveScript::AddNamedItem.

*dwReturnMask*

[in] A bit mask specifying what information about the item should be returned. The scripting engine should request the minimum needed information because some of the return parameters (for example, ITypeInfo) can take considerable time to load or generate. Can be a combination of the following values:

| Value | Meaning |
|---|---|
| SCRIPTINFO_IUNKNOWN | Return the IUnknown interface for this item. |
| SCRIPTINFO_ITYPEINFO | Return the ITypeInfo interface for this item. |

*ppunkitem*

[out] Address of a variable that receives a pointer to the IUnknown interface associated with the given item. The scripting engine can use the QueryInterface method to obtain the IDispatch interface for the item. This parameter receives NULL if *dwReturnMask* does not include the SCRIPTINFO_IUNKNOWN value. Also, it receives NULL if there is no object associated with the item name; this mechanism is used to create a simple class when the named item was added with the SCRIPTITEM_CODEONLY flea set.

*ppTypeInfo*

[out] Address of a variable that receives a pointer to the ITypeInfo interface associated with the item. This parameter receives NULL if *dwReturnMask* does not include the SCRIPTINFO_ITYPEINFO value, or if type information is not available for this item. If type information is not available, the object cannot source events, and name binding must be realized with IDispatch::GetIDsOfNames. Note that this ITypeInfo describes the coclass (TKIND_COCLASS) because the object may support multiple interfaces and event interfaces. If the item supports the IProvideMultipleTypeInfo interface, the ITypeInfo

UNITED STATES PATENT AND TRADEMARK OFFICE
CERTIFICATE OF CORRECTION

PATENT NO.    : 6,275,868 B1
DATED         : August 14, 2001
INVENTOR(S)   : Fraley et al.

It is certified that error appears in the above-identified patent and that said Letters Patent is hereby corrected as shown below:

interface corresponds to the ITypeInfo of index zero obtained from IProvideMultipleTypeInfo::GetinfoOfIndex.

This method retrieves only the information indicated by the *dwReturnMask* parameter. This improves performance, for example, in the case where an ITypeInfo interface is not needed for an item.

| Returns | |
|---|---|
| S_OK | The requested interface pointer was successfully retrieved. The *ppunkItem* or *ppTypeInfo* parameter contains the pointer. |
| E_POINTER | An invalid pointer was specified. |
| E_INVALIDARG | An argument was invalid. |
| TYPE_E_ELEMENTNOTFOUND | An item of the specified name was not found. |

See also IActiveScript::AddNamedItem

IActiveScriptSite::GetLCID
HRESULT GetLCID (
    LCID *plcid      //      address of variable for language identifier
);

Retrieves the locale identifier associated with the host's user interface. The scripting engine uses the identifier to ensure that error strings and other user-interface elements surfaced by the engine appear in the appropriate language. If this method returns E_NOTIMPL, the system-defined locale identifier should be used.

*plcid*
    [out] Address of a variable that receives the locale identifier for user-interface elements displayed by the scripting engine.

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

| Returns | |
|---|---|
| S_OK | The locale identifier was successfully retrieved. The *plcid* parameter contains the identifier. |
| E_POINTER | An invalid pointer was specified. |
| E_NOTIMPL | This method is not implemented. Use the system-defined locale. |

IActiveScriptSite::OnEnterScript
HRESULT OnEnterScript (void);

Informs the host that the scripting engine has begun executing the script code.

The scripting engine must call this method on every entry or reentry into the scripting engine. For example, if the script calls an object that then fires an event handled by the scripting engine, the scripting engine must call OnEnterScript before executing the event, and must call OnLeaveScript after executing the event but before returning to the object that fired the event. Calls to this method can be nested. Every call to OnEnterScript requires a corresponding call to OnLeaveScript.

| Returns | |
|---|---|
| S_OK | The method succeeded. |

See also IActiveScriptSite::OnLeaveScript

IActiveScriptSite::OnLeaveScript
HRESULT IActiveScriptSite::OnLeaveScript (void);

Informs the host that the scripting engine has returned from executing script code.

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

The scripting engine must call this method before returning control to a caller that entered the scripting engine. For example, if the script calls an object that then fires an event handled by the scripting engine, the scripting engine must call <u>OnEnterScript</u> before executing the event, and must call OnLeaveScript after executing the event before returning to the object that fired the event. Calls to this method can be nested. Every call to <u>OnEnterScript</u> requires a corresponding call to OnLeaveScript.

| Returns | |
|---|---|
| S_OK | The method was successful. |

See also <u>IActiveScriptSite::OnEnterScript</u>

IActiveScriptSite::OnScriptError
HRESULT IActiveScriptSite::OnScriptError (
    IActiveScriptError*pase //        address of error interface
);

Informs the host that an execution error occurred while the engine was running the script.

*pase*
    [in] Address of the error object's <u>IActiveScriptError</u> interface. A host can use this interface to obtain information about the execution error.

| Returns | |
|---|---|
| S_OK | The scripting engine should continue running the script as best as possible (perhaps abandoning the processing of this event). |
| S_FALSE | The scripting engine should continue running the script in the debugger, if a debugger is available. If a debugger is not available, this error should be handled in the same way as E_FAIL. |
| E_FAIL | The scripting engine should abort execution of the script and return it |

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

|  | to the initialized state. In this case, the *pexcepinfo* parameter obtained from IActiveScriptError::GetExceptionInfo is generally passed to OnScriptTerminate. |
|---|---|

See also IActiveScriptError, IActiveScriptError::GetExceptionInfo

IActiveScriptSite::OnScriptTerminate
HRESULT OnScriptTerminate (
    VARIANT *pvarResult,   //     address of script results
    EXCEPINFO *pexcepinfo   //     address of structure with exception information
);

Informs the host that the script has completed execution.

*pvarResult*
    [in] Address of a variable that contains the script result, or NULL if the script produced no result.

*pexcepinfo*
    [in] Address of an EXCEPINFO structure that contains exception information generated when the script terminated, or NULL if no exception was generated.

The scripting engine calls this method before the call to OnStateChange(SCRIPTSTATE_INITIALIZED) is completed. The OnScriptTerminate method can be used to return completion status and results to the host. Note that many script languages, which are based on sinking events from the host, have life spans that are defined by the host. In this case, this method may never be called.

| Returns |  |
|---|---|
| S_OK | The method succeeded. |

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

IActiveScriptSite::OnStateChange

HRESULT IActiveScriptSite::OnStateChange (
    SCRIPTSTATE ssScriptState  //        new state of engine
);

Informs the host that the scripting engine has changed states.

*ssScriptState*

[in] Value that indicates the new script state. See IActiveScript::GetScriptState for a description of the states.

| Returns | |
|---|---|
| S_OK | The method succeeded. |

See also IActiveScript::GetScriptState

IActiveScriptSiteWindow

This interface is implemented by hosts that support a user interface on the same object as IActiveScriptSite. Hosts that do not support a user interface, such as servers, would not implement the IActiveScriptSiteWindow interface. The scripting engine accesses this interface by calling QueryInterface from IActiveScriptSite.

Methods in Vtable Order

| IUnknown methods | Description |
|---|---|
| QueryInterface | Returns pointers to supported interfaces. |
| AddRef | Increments the reference count. |
| Release | Decrements the reference count. |
| IActiveScriptSiteWindow methods | Description |
| GetWindow | Retrieves the window handle that can act as the |

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

|  | owner of a pop-up window that the scripting engine needs to display. |
|---|---|
| EnableModeless | Causes the host to enable or disable its main window as well as any modeless dialog boxes. |

IActiveScriptSite:: EnableModeless
HRESULT IActiveScriptSite::EnableModeless (
    BOOL fEnable      //     enable flag
);

Causes the host to enable or disable its main window as well as any modeless dialog boxes.

*fEnable*

[in] Flag that, if TRUE, enables the main window and modeless dialogs or, if FALSE, disables them.

This method is identical to IOleInPlaceFrame::EnableModeless.

Calls to this method can be nested.

| Returns |  |
|---|---|
| S_OK | The method was successful. |
| E_FAIL | An error occurred. |

IActiveScriptSite::GetWindow
HRESULT GetWindow (
    HWND *phwnd    //     address of variable for window handle
);

UNITED STATES PATENT AND TRADEMARK OFFICE
CERTIFICATE OF CORRECTION

PATENT NO.     : 6,275,868 B1
DATED          : August 14, 2001
INVENTOR(S)    : Fraley et al.

It is certified that error appears in the above-identified patent and that said Letters Patent is hereby corrected as shown below:

Retrieves the handle of a window that can act as the owner of a pop-up window that the scripting engine needs to display.

*phwnd*
    [out] Address of a variable that receives the window handle.

This method is similar to IOIeWindow::GetWindow.

| Returns | |
|---|---|
| S_OK | The window handle was successfully retrieved. |
| E_FAIL | An error occurred. |

Enumerations

SCRIPTSTATE typedef enum tagSCRIPTSTATE {
    SCRIPTSTATE_UNINITIALIZED = 0,
    SCRIPTSTATE_INITIALIZED = 5,
    SCRIPTSTATE_STARTED = 1,
    SCRIPTSTATE_CONNECTED = 2,
    SCRIPTSTATE_DISCONNECTED = 3,
    SCRIPTSTATE_CLOSED = 4
} SCRIPTSTATE;

Contains named constant values that specify the state of a scripting engine. This enumeration is used by the IActiveScript::GetScriptState, IActiveScript::SetScriptState, and IActiveScriptSite::OnStateChange methods.

Elements

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

| SCRIPTSTATE_UNINITIALIZED | The script has just been created, but has not yet been initialized using an IPersist\* interface and IActiveScript::SetScriptSite. |
|---|---|
| SCRIPTSTATE_INITIALIZED | The script has been initialized, but is not running (connecting to other objects or sinking events) or executing any code. Code can be queried for execution by calling IActiveScriptParse::ParseScriptText. |
| SCRIPTSTATE_STARTED | The script can execute code, but is not yet sinking the events of objects added by the IActiveScript::AddNamedItem method. |
| SCRIPTSTATE_CONNECTED | The script is loaded and connected for sinking events. |
| SCRIPTSTATE_DISCONNECTED | The script is loaded and has a run-time execution state, but is temporarily disconnected from sinking events. |
| SCRIPTSTATE_CLOSED | The script has been closed. The scripting engine no longer works and returns errors for most methods. |

See also IActiveScript::GetScriptState, IActiveScript::SetScriptState, IActiveScriptSite::OnStateChange

SCRIPTTHREADSTATE

```
typedef enum tagSCRIPTTHREADSTATE    {
     SCRIPTTHREADSTATE_NOTINSCRIPT   = 0,
     SCRIPTTHREADSTATE_RUNNING       = 1
} SCRIPTTHREADSTATE;
```

Contains named constant values that specify the state of a thread in a scripting engine. This enumeration is used by the IActiveScript::GetScriptThreadState method.

UNITED STATES PATENT AND TRADEMARK OFFICE
CERTIFICATE OF CORRECTION

PATENT NO. : 6,275,868 B1
DATED : August 14, 2001
INVENTOR(S) : Fraley et al.

It is certified that error appears in the above-identified patent and that said Letters Patent is hereby corrected as shown below:

Elements
SCRIPTTHREADSTATE_NOTINSCRIPT
    The specified thread is not currently servicing a scripted event, processing immediately executed script text, or running a script macro.
SCRIPTTHREADSTATE_RUNNING
    The specified thread is actively servicing a scripted event, processing immediately executed script text, or running a script macro.
See also IActiveScript::GetScriptThreadState.

Signed and Sealed this

Thirteenth Day of May, 2003

JAMES E. ROGAN
*Director of the United States Patent and Trademark Office*